United States Patent
An

(10) Patent No.: US 12,122,317 B2
(45) Date of Patent: Oct. 22, 2024

(54) VEHICLE FOR CONTROLLING A PLURALITY OF AIRBAG MODULES AND METHOD OF CONTROLLING THE SAME

(71) Applicants: HYUNDAI MOTOR COMPANY, Seoul (KR); KIA CORPORATION, Seoul (KR)

(72) Inventor: Seungho An, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/122,536

(22) Filed: Mar. 16, 2023

(65) Prior Publication Data

US 2023/0219518 A1    Jul. 13, 2023

Related U.S. Application Data

(63) Continuation of application No. 16/839,525, filed on Apr. 3, 2020, now Pat. No. 11,628,793.

(30) Foreign Application Priority Data

Dec. 10, 2019    (KR) .................. 10-2019-0163604

(51) Int. Cl.
*B60R 21/213*    (2011.01)
*B60N 2/14*    (2006.01)
(Continued)

(52) U.S. Cl.
CPC .............. *B60R 21/213* (2013.01); *B60N 2/14* (2013.01); *B60R 11/04* (2013.01); *B60R 21/013* (2013.01);
(Continued)

(58) Field of Classification Search
CPC ..................... B60R 21/01512; B60R 21/213
See application file for complete search history.

(56) References Cited

U.S. PATENT DOCUMENTS 9,862,346 B2    1/2018    Choi
10,343,639 B2    7/2019    Iyer et al.
(Continued)

FOREIGN PATENT DOCUMENTS

CN    106671924 A    5/2017
CN    110431048 A    11/2019
(Continued)

OTHER PUBLICATIONS

Office Action cited in German patent application No. 10 2020 204 899.1; Jul. 12, 2023; 15 pp.
(Continued)

*Primary Examiner* — Jess Whittington
(74) *Attorney, Agent, or Firm* — Lempia Summerfield Katz LLC

(57) ABSTRACT

A vehicle and control method include: a seat; an image acquirer to acquire an image of the seat; a first type of roof airbag module in a fixed position in a first area of a headlining; a rail member in a second area of the headlining in a left-right direction of a vehicle body; a second type of roof airbag module in the rail member and movable in left and right directions along the rail member; an angle detector to detect a rotation angle of the seat; and a controller. The controller identifies the seat rotation angle based on the image of the seat and controls activation of at least the first type of roof airbag module or the second type of roof airbag module based on at least the seat rotation angle based on the image of the seat or detected by the angle detector.

11 Claims, 10 Drawing Sheets

(51) Int. Cl.
  *B60R 11/04*    (2006.01)
  *B60R 21/013*    (2006.01)
  *B60R 21/0136*    (2006.01)
  *B60R 21/015*    (2006.01)
  *B60R 21/214*    (2011.01)
  *B60W 30/08*    (2012.01)
  *B60W 60/00*    (2020.01)
  *G05D 1/00*    (2006.01)
  *G06T 7/70*    (2017.01)
  *G06V 20/58*    (2022.01)
  *G06V 20/59*    (2022.01)
  *B60R 11/00*    (2006.01)
  *B60R 21/00*    (2006.01)
  *B60R 21/16*    (2006.01)
  *B60R 21/231*    (2011.01)

(52) U.S. Cl.
  CPC .... *B60R 21/0136* (2013.01); *B60R 21/01512* (2014.10); *B60R 21/01554* (2014.10); *B60R 21/214* (2013.01); *B60W 30/08* (2013.01); *B60W 60/0016* (2020.02); *G05D 1/0214* (2013.01); *G06T 7/70* (2017.01); *G06V 20/58* (2022.01); *G06V 20/593* (2022.01); *B60R 2011/004* (2013.01); *B60R 2021/006* (2013.01); *B60R 2021/161* (2013.01); *B60R 21/23138* (2013.01); *B60W 2420/403* (2013.01); *B60W 2554/00* (2020.02); *G06T 2207/30268* (2013.01)

(56) References Cited

U.S. PATENT DOCUMENTS

| | | | |
|---|---|---|---|
| 10,836,401 | B1 * | 11/2020 | Christensen ...... B60W 50/0098 |
| 10,858,011 | B1 * | 12/2020 | Christensen ............ B60R 21/20 |
| 10,953,830 | B1 * | 3/2021 | Christensen ...... B60R 21/01512 |
| 10,960,839 | B2 | 3/2021 | Imura |
| 2017/0129442 | A1 | 5/2017 | Choi |
| 2017/0267205 | A1 | 9/2017 | Numazawa |
| 2019/0084517 | A1 * | 3/2019 | Iyer ........................ B60N 2/143 |
| 2020/0017059 | A1 | 1/2020 | Choi |
| 2020/0070763 | A1 | 3/2020 | Hill et al. |
| 2020/0130627 | A1 * | 4/2020 | Imura .................. B60R 21/201 |
| 2020/0215938 | A1 * | 7/2020 | Tanabe .................. B60R 21/207 |
| 2020/0269800 | A1 | 8/2020 | White et al. |
| 2020/0290549 | A1 * | 9/2020 | Buice ................... B60R 21/217 |
| 2021/0024027 | A1 * | 1/2021 | Kanegae ............... B60R 21/231 |

FOREIGN PATENT DOCUMENTS

| | | |
|---|---|---|
| DE | 102018123084 A1 | 3/2019 |
| JP | 6069450 B1 | 1/2017 |
| KR | 102005746 B1 | 7/2019 |

OTHER PUBLICATIONS

Office Action cited in Chinese patent application No. 202010306706.6; Jun. 5, 2024; 18 pp.

* cited by examiner

VEHICLE FOR CONTROLLING A PLURALITY OF AIRBAG MODULES AND METHOD OF CONTROLLING THE SAME

CROSS-REFERENCE TO RELATED APPLICATION

This application is a continuation of non-provisional U.S. patent application Ser. No. 16/839,525, filed on Apr. 3, 2020, which claims priority to and the benefit of Korean Patent Application No. 10-2019-0163604, filed on Dec. 10, 2019 in the Korean Intellectual Property Office, the disclosures of each of which are incorporated herein by reference.

BACKGROUND

1. Field

The present disclosure relates to a vehicle for controlling driving of an airbag in response to a position of an occupant, and a method of controlling the same.

2. Description of the Related Art

A vehicle represents a machine that travels on a road by driving vehicle wheels. The vehicle is equipped with various safety devices for protecting an occupant, assisting the drive, ensuring the safety of an occupant, and improving the riding comfort.

The safety devices may include an airbag device that improve the safety of occupants, such as drivers in the event of a vehicle crash. The safety devices may further include an electronic stability control (ESC) that controls the posture of the vehicle during acceleration or cornering of the vehicle. The safety devices may further include a traction control system (TCS) that controls the driving force of the vehicle to prevent tires from idling due to an excessive driving force when starting or accelerating the vehicle on a slippery road, such as a rainy or snowy road. The safety devices may further include an anti-lock brake system (ABS) that prevents the tires from being locked when the vehicle brakes suddenly. The safety devices may further include a tire pressure monitoring device (TPMS) that provides information, such as tire air pressure and temperature, through an auto-detection sensor attached to the tires.

Recently, a lot of research has been conducted on autonomous driving vehicles that automatically travel to a destination by recognizing a road environment by themselves, determining a traveling situation, and controlling traveling of the vehicle according to a selected route.

Such an autonomous driving vehicle includes various sensors that collect various types of information for controlling autonomous driving. Accordingly, the autonomous driving vehicle needs to control the safety devices using various sensors in view of autonomous driving.

For example, because the driver does not need to manually drive the vehicle, the autonomous driving vehicle may freely rotate all seats including the driver's seat. This allows the driver to talk face-to-face with the occupant in the back seat. In this case, a front collision may occur while the driver is not looking forward. Thus, the autonomous driving vehicle may not protect the driver even when an airbag device provided on a driver's seat side operates. This is because the airbag device provided on the driver's seat side is designed to protect the driver based on a posture where the driver is seated or facing forward.

SUMMARY

Therefore, an object of the present disclosure is to provide a vehicle for controlling the position of an airbag module adjacent a seat and deployment of an airbag based on a rotation angle of the seat. Another object of the present disclosure is to provide a method of controlling the same.

Another object of the present disclosure is to provide a vehicle for acquiring a rotation angle of a seat based on an image acquired by an image acquirer for acquiring an interior image when a detector for detecting the rotation angle of the seat fails. Another object of the present disclosure is to provide a method of controlling the same.

Additional aspects of the present disclosure are set forth, in part, in the following description and, in part, should be apparent from the description or may be learned, in part, by practice of the present disclosure.

According to an aspect of the present disclosure, a vehicle includes: a seat; a first type of roof airbag module provided in a headlining and adjacent to a side of the seat; and a second type of roof airbag module provided in the headlining and adjacent to a rear of the seat. The vehicle further includes an angle detector configured to detect a rotation angle of the seat. The vehicle further includes a controller configured to control activation of the first type of roof airbag module when the detected rotation angle of the seat is greater than a first reference angle and less than or equal to a second reference angle. The controller is further configured to control activations of the first type of roof airbag module and the second type of roof airbag module when the detected rotation angle of the seat is greater than the second reference angle and less than or equal to a third reference angle.

The vehicle may further include a rail member provided in the headlining and mounted for the second type of roof airbag module movably.

The controller may control activation of the first type of roof airbag module and the second type of roof airbag module when the detected rotation angle of the seat is greater than the third reference angle and less than or equal to a fourth reference angle. The controller may control rotation of the second type of roof airbag module based on the detected rotation angle of the seat. The controller may control movement of the second type of roof airbag module based on the detected rotation angle of the seat and a radius of rotation of the seat.

The vehicle may further include an image acquirer configured to acquire an image of the seat. The controller may diagnose whether the angle detector fails. When the controller determines that the angle detector fails, the controller may acquire the rotation angle of the seat based on the image of the seat acquired by the image acquirer.

The vehicle may further include an image acquirer configured to acquire an image of the seat. The controller may determine whether an infant or a child sits on the seat based on the image of the seat acquired by the image acquirer. The controller may control deactivation of the first type of roof airbag module and the second type of roof airbag module when the controller determines that the infant or the child sits in the seat.

The vehicle may further include a front airbag module provided in front of the seat and a side airbag module provided between the seat and a door. The controller may control activation of the front airbag module and the side airbag module when the controller determines that the detected rotation angle of the seat is less than the first reference angle.

The vehicle may further include a front airbag module provided in front of the seat. The controller may control activation of the front airbag module when the controller determines that the detected rotation angle of the seat is greater than the first reference angle and less than or equal to the second reference angle.

The vehicle may further include a front airbag module provided in front of the seat and a side airbag module provided between the seat and a door. The controller may control activation of the front airbag module, the side airbag module, and the second type of roof airbag module when the controller determines that the detected rotation angle of the seat is greater than a fourth reference angle.

The second reference angle may be an angle greater than the first reference angle. The third reference angle may be an angle greater than the second reference angle. The fourth reference angle may be an angle greater than the third reference angle.

The vehicle may further include a collision detector configured to detect a collision with an obstacle. The controller may control deployment and expansion of the activated airbag module based on collision information detected by the collision detector.

A direction in which the second type of roof airbag module is deployed may be opposite to a direction in which the seat is rotated 180 degrees with respect to a forward traveling direction of the vehicle.

The vehicle may further include an external image acquirer configured to acquire an image of a road and a road detector configured to detect a distance to an obstacle. The controller may control autonomous driving based on the image of the road acquired by the external image acquirer and the distance to the obstacle detected by the road detector.

According to another aspect of the present disclosure, a method of controlling a vehicle includes detecting a rotation angle of a seat. The method further includes controlling activation of a first type of roof airbag module provided in a central portion of a headlining and located at a side of the seat when the detected rotation angle of the seat is greater than a first reference angle and less than or equal to a second reference angle. The method further includes controlling activation of the first type of roof airbag module and a second type of roof airbag module provided in the central portion of the headlining and provided at a rear of the seat when the detected rotation angle of the seat is greater than the second reference angle and less than or equal to a third reference angle. The method further includes determining whether a collision with an obstacle has occurred during traveling. The method further includes deploying and expanding the activated airbag module when determining that the collision with the obstacle has occurred.

The first type of roof airbag module may be a fixed type roof airbag module fixed to the headlining. The second type of roof airbag module may be a movable type roof airbag module mounted to and movable along a rail provided on the headlining and rotatable.

The method may further include: controlling activation of the first type of roof airbag module and the second type of roof airbag module when the detected rotation angle of the seat is greater than the third reference angle and less than or equal to a fourth reference angle. The method may further include controlling rotation of the second type of roof airbag module based on the detected rotation angle of the seat. The method may further include controlling movement of the second type of roof airbag module based on the detected rotation angle of the seat and a radius of rotation of the seat.

The detecting of the rotation angle of the seat may include detecting the rotation angle of the seat using an angle detector provided on the seat.

The detecting of the rotation angle of the seat may include detecting the rotation angle of the seat based on an image acquired by an image acquirer in the vehicle.

The detecting of the rotation angel of the seat based on the image may include diagnosing a failure of the angle detector and, when determining that the angle detector fails, acquiring the rotation angle of the seat based on the image acquired by the image acquirer.

The method may further include: acquiring an image of the seat by an image acquirer; determining whether an infant or a child sits on the seat based on the image acquired by the image acquirer; and controlling deactivation of the first type of roof airbag module and the second type of roof airbag module when determining that the infant or the child sits on the seat.

The method may further include controlling activation of a front airbag module provided in front of the seat and a side airbag module provided adjacent to or between the seat and a door when determining that the detected rotation angle of the seat is less than the first reference angle.

The method may further include controlling activation of a front airbag module provided in front of the seat, a side airbag module provided adjacent to or between the seat and a door and the second type of roof airbag module when the detected rotation angle of the seat is greater than the fourth reference angle.

According to another aspect of the present disclosure, a vehicle includes: a seat; an image acquirer configured to acquire an image of the seat; a first type of roof airbag module provided in a first area of a headlining with a fixed position in the first area; a rail member provided in a second area of the headlining and provided in a direction from left to right of a body of the vehicle; a second type of roof airbag module in the rail member provided to be movable in left and right directions along the rail member; an angle detector configured to detect a rotation angle of the seat; and a controller. The controller is configured to identify the rotation angle of the seat based on the image of the seat acquired by the image acquirer. The controller is also configured to control activation of at least one of the first type of roof airbag module or the second type of roof airbag module based on at least one of the rotation angle of the seat identified by the image of the seat or the rotation angle of the seat detected by the angle detector.

The controller may be configured to determine whether an infant or a child sits on the seat based on the image of the seat acquired by the image acquirer and to control deactivation of the first type of roof airbag module and the second type of roof airbag module when the controller determines that the infant or the child sits on the seat.

The controller may be configured to control activation of the first type of roof airbag module when the rotation angle of the seat is greater than a first reference angle and less than or equal to a second reference angle. The controller may also be configured to control activations of the first type of roof airbag module and the second type of roof airbag module when the rotation angle of the seat is greater than the second reference angle and less than or equal to a third reference angle.

The vehicle may further include a front airbag module provided in front of the seat and a side airbag module provided between the seat and a door. The controller may be configured to control activation of the front airbag module and the side airbag module when the rotation angle of the seat is less than the first reference angle. The controller may also be configured to control activation of the front airbag module when the rotation angle of the seat is greater than the first reference angle and less than or equal to the second reference angle. The controller may also be configured to control activation of the front airbag module, the side airbag module, and the second type of roof airbag module when the rotation angle of the seat is greater than a fourth reference angle.

The second reference angle may be an angle greater than the first reference angle, the third reference angle is an angle greater than the second reference angle, and a fourth reference angle is an angle greater than the third reference angle.

The vehicle may further include a collision detector configured to detect a collision with an obstacle. The controller may be configured to control deployment and expansion of the activated airbag module among the first type of roof airbag module and the second type of roof airbag module based on collision information detected by the collision detector. A direction in which the second type of roof airbag module is deployed may be opposite to a direction in which the seat is rotated 180 degrees with respect to a forward traveling direction of the vehicle.

The vehicle may further include an external image acquirer configured to acquire an image of a road and a road detector configured to detect a distance to an obstacle. The controller may be configured to control autonomous driving based on the image of the road acquired by the external image acquirer and the distance to the obstacle detected by the road detector.

According to another aspect of the present disclosure, a method of controlling a vehicle includes: detecting, by an angle detector, a rotation angle of a seat; acquiring, by an image acquirer, an image of the seat; and identifying, by a controller, the rotation angle of the seat based on the image of the seat acquired by the image acquirer. The method further includes controlling, by the controller, activation of at least one of a first type of roof airbag module or a second type of roof airbag module based on at least one of the rotation angle of the seat identified by the image of the seat or the rotation angle of the seat detected by the angle detector. The method also includes determining, by a collision detector, whether a collision with an obstacle has occurred during traveling and deploying, by the controller, and expanding the activated airbag module when determining that a collision with the obstacle has occurred. The first type of roof airbag module is provided in a first area of a headlining with a fixed position in the first area. The second type of roof airbag module is in a rail member and provided to be movable in left and right directions along the rail member.

The method may further include determining, by the controller, whether an infant or a child sits on the seat based on the image acquired by the image acquirer. The method may also include controlling, by the controller, deactivation of the first type of roof airbag module and the second type of roof airbag module when determining that the infant or the child sits on the seat.

Controlling activation of at least one of the first type of roof airbag module or the second type of roof airbag module may include: controlling activation of the first type of roof airbag module when the rotation angle of the seat is greater than a first reference angle and less than or equal to a second reference angle; and controlling activations of the first type of roof airbag module and the second type of roof airbag module when the rotation angle of the seat is greater than the second reference angle and less than or equal to a third reference angle.

The method may further include controlling, by the controller, activation of a front airbag module and a side airbag module when the rotation angle of the seat is less than the first reference angle. The method may also include controlling, by the controller, activation of the front airbag module when the rotation angle of the seat is greater than the first reference angle and less than or equal to the second reference angle. The method may also include controlling, by the controller, activation of the front airbag module, the side airbag module, and the second type of roof airbag module when the rotation angle of the seat is greater than a fourth reference angle. The front airbag module may be provided in front of the seat and the side airbag module may be provided between the seat and a door.

BRIEF DESCRIPTION OF THE DRAWINGS

These and/or other aspects of the disclosure should become apparent and more readily appreciated from the following description of the embodiments, taken in conjunction with the accompanying drawings of which.

DETAILED DESCRIPTION

Figure 1:
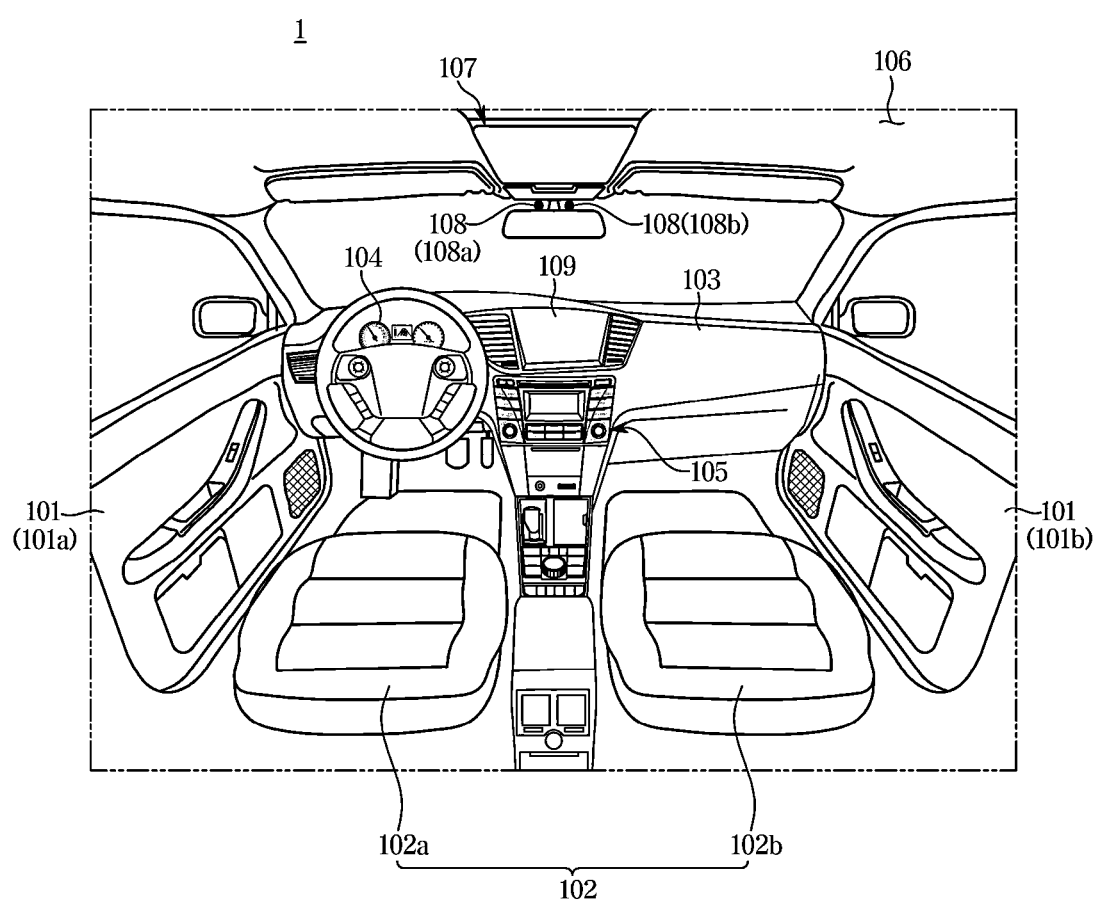
FIG. 1 is a diagram illustrating an interior of a vehicle according to an embodiment.

Identical numerals refer to identical or equivalent elements throughout the specification. Not all elements of embodiments of the present disclosure are described. A description of the features commonly known in the art or duplicated with those in the other embodiments has been omitted. The terms as used throughout the specification, such as "~ part", "~ module", "~ member", "~ block", etc., may be implemented in software and/or hardware. A plurality of "~ parts", "~ modules", "~ members", or "-blocks" may be implemented in a single element, or a single "~ part", "~ module", "~ member", or "~ block" may include a plurality of elements.

It should be further understood that the term "connect" or its derivatives refer both to direct and indirect connection and the indirect connection includes a connection over a wireless communication network.

It should be further understood that the terms "comprises" and/or "comprising," when used in this specification, specify the presence of stated features, integers, steps, operations, elements, and/or components, but do not preclude the presence or addition of one or more other features, integers, steps, operations, elements, and/or components. When a component, device, or element of the disclosure is described as having a purpose or performing an operation, function, or the like, the component, device, or element should be considered herein as being "configured to" meet that purpose or to perform that operation, function, or the like.

Although the terms "first," "second," "A," "B," etc. may be used to describe various components, the terms do not limit the corresponding components, but are used only for the purpose of distinguishing one component from another component.

As used herein, the singular forms "a," "an," and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the disclosure are described with reference to the accompanying drawings.

Figure 2:
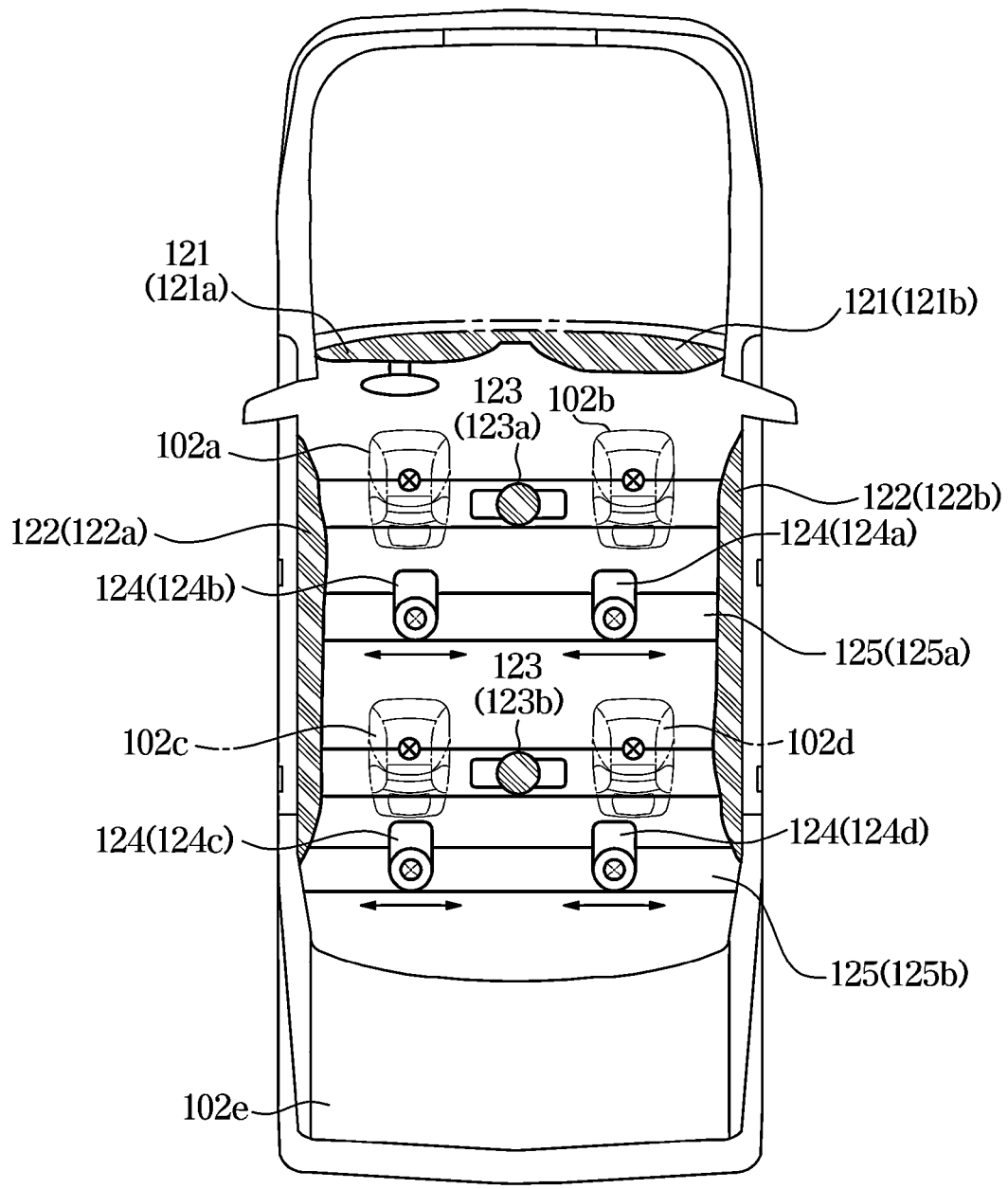
FIG. 2 is a diagram illustrating an arrangement of a plurality of seats and a plurality of airbag devices provided in a vehicle according to an embodiment.
Figure 3:
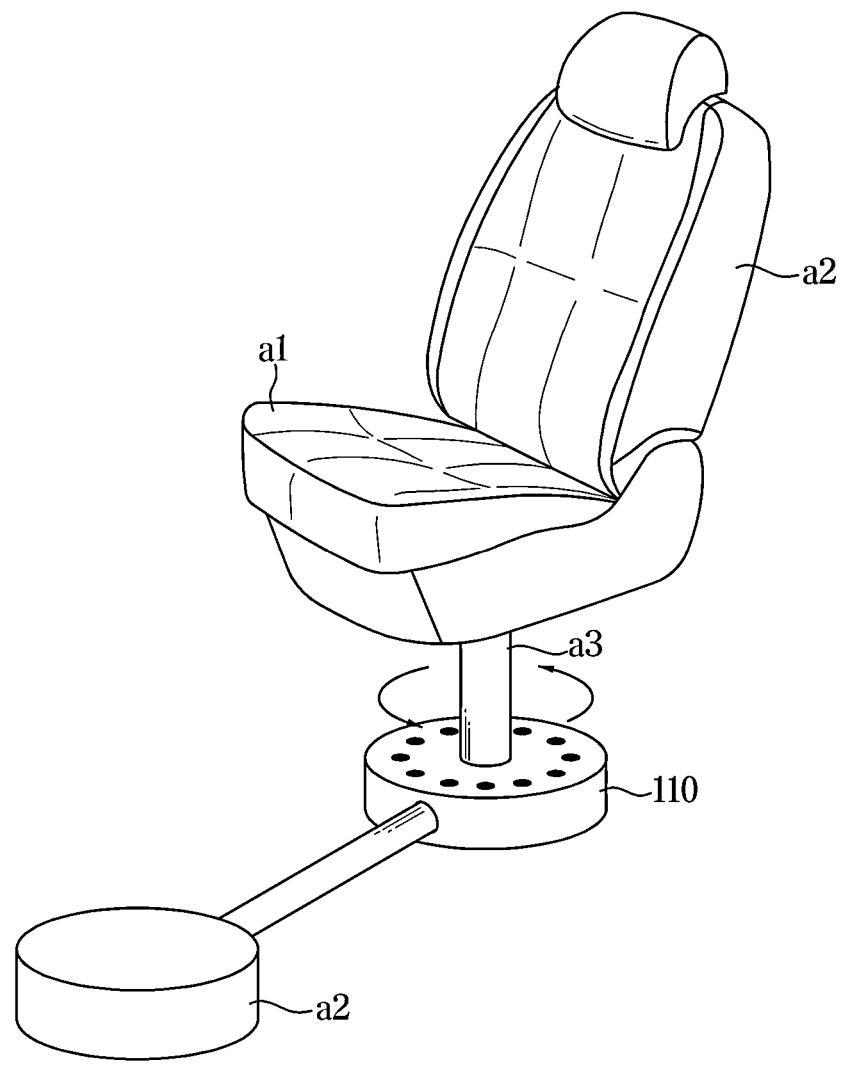
FIG. 3 is a diagram illustrating a structure of a seat provided in a vehicle according to an embodiment.

FIG. 1 is a diagram illustrating an interior of a vehicle according to an embodiment. FIG. 2 is a diagram illustrating an arrangement of a plurality of seats and a plurality of airbag devices provided in a vehicle according to an embodiment. FIG. 3 is a diagram illustrating a structure of a seat provided in a vehicle according to an embodiment.

The vehicle 1 includes a body having an interior, an exterior, and a chassis, which is a part of the vehicle 1 except for the body. Mechanical devices required for traveling are installed on the chassis.

The exterior of the body includes a front panel, a bonnet, a roof panel, a rear panel, and a trunk on which luggage is loaded. The exterior of the body further includes front, rear, left, and right doors 101 (101a and 101b). Window glass is provided on the front, rear, left, and right doors 101 (101a and 101b) and configured to be opened and closed.

Referring to FIG. 1, the interior of the body includes seats 102 (102a and 102b) on which occupants can sit, a dashboard 103, and a cluster (i.e., an instrument cluster or panel 104) provided on the dashboard 103 and providing guidance on driving functions and vehicle information. The vehicle information includes, for example, vehicle speed, engine revolution per minute (RPM), fuel amount, coolant, and the like. The interior of the body further includes a head unit 105 provided adjacent to the dashboard 103 and for controlling an audio device, an air conditioner, a Bluetooth device, and a heating wire for the seats. The interior of the body further includes a headlining 106 provided at an upper side of each door 101 and forming the interior of the roof or ceiling. The interior of the body further includes an overhead console 107 provided on the headlining 106.

The overhead console 107 may be provided with interior lighting that performs an interior lighting function, and an on/off button for receiving turn-on/off commands of the interior lighting.

In addition, the vehicle may further include an image acquirer 108 provided adjacent to at least one of the overhead console 107 and a rearview or interior mirror, and configured to acquire an image of the seat 102 and the occupants of the vehicle interior. The image acquirer 108 may include at least one camera. In this embodiment, the image acquirer 108 includes two or more cameras 108a and 108b. In addition, the two or more cameras 108a and 108b may acquire images of different areas of the interior area of the vehicle.

The vehicle may further include a terminal 109 embedded into or mounted on the dash board 103.

The terminal 109 displays an image regarding at least one function selected by the user among an audio function, a video function, a navigation function, a broadcasting function (a Digital Multimedia Broadcasting (DMB) function), a radio function, a content playback function, an internet search function, and an autonomous driving information display function.

The terminal 109 may include a display and may further include an input.

The terminal 109 may include a display panel as the display and a touch panel as the input.

When the terminal 109 is implemented using only the display panel, the terminal 109 may receive a selection of a button displayed on the display panel using an input (not shown) provided in the vehicle. The input receives an on-off command for at least one function among a plurality of functions, receives an operation command for the at least one input function, and receives information about a setting value for changing operating states of the plurality of functions. For example, the input may receive an execution command of at least one of a radio function, an audio function, a video function, a map display function, a navigation function, an autonomous driving function, a DMB function, a content playback function, and an internet search function.

The input may be implemented using at least one of a physical button, a key, a switch, and a lever. The input may be implemented with a jog dial (not shown) or a touch pad (not shown) for inputting a movement command and a selection command of a cursor displayed on a vehicle terminal (audio video navigation, i.e. "AVN").

The display of the terminal displays operation information of the function being performed.

For example, the display may display information related to a phone call, display information about content being output through the terminal 109, display information related to music playback, or display external broadcast information.

When a navigation mode is performed, the display of the terminal displays a route from a current location to a destination and displays road guidance information.

When an autonomous driving mode is performed, the display of the terminal may display a route from a current location to a destination and may display road environment information of the surroundings of the vehicle.

Referring to FIG. 2, each seat 102 is a chair on which an occupant can sit. The seats 102 include a driver's seat 102a on which a driver sits, and a passenger seat 102b provided next to the driver's seat and on which a passenger occupant sits. The seats 102 may further include rear seats 102c and 102d provided at the rear of the driver's seat and the passenger seat 102b and on which additional occupants may sit.

Each of the seats 102a, 102b, 102c, and 102d may be rotatable about an axis (i.e., a vertical axis). Each of the seats 102a, 102b, 102c, and 102d may be rotatable 360 degrees leftward and 360 degrees rightward.

Each of the seats 102a, 102b, 102c, and 102d may be automatically rotated in response to a user command. In addition, each of the seats 102a, 102b, 102c, and 102d may be manually rotated by an external force of the user.

Referring to FIG. 3, each of the seats 102a, 102b, 102c, and 102d includes a seat plate member a1 which contacts the buttocks of the seat occupant. Each of the seats 102a, 102b, 102c, and 102d further includes a back plate member a2 provided on one side of the seat plate member a1 and which contacts a back of the occupant. Each of the seats 102a, 102b, 102c, and 102d further includes a connecting member a3 fixedly provided at a lower side of the seat plate member a1. Each of the seats 102a, 102b, 102c, and 102d further includes a rotating member a4 connected to the connecting member a3 and configured to rotate the seat plate member a1 and the back plate member a2. The rotating member a4 may include a motor.

Each of the seats 102a, 102b, 102c, and 102d may further include an angle detector 110 that detects a rotation angle of the rotation member a4. In other words, the angle detector 110 may detect the rotation angle of each motor. Thus, the angle detector 110 may detect the rotation direction and the rotation amount of the seat 102 corresponding to the rotation direction and the rotation amount of the motor. In addition, the rotation angle detected by the angle detector 110 may be an angle corresponding to the rotation angle of the back plate member a2 of the seat 102 or the rotation angle of the seat plate member a1 of the seat 102.

The angle detector 110 may include at least one of an encoder, a hall sensor, a resolver, a current sensor, and a voltage sensor.

Each of the seats 102a, 102b, 102c, and 102d may further include an input configured to receive a rotation command of the seat 102 as a user input.

Referring to FIG. 2, the vehicle may include an airbag device 120.

The airbag device 120 includes a plurality of front airbag modules 121 provided in the dash board 103 or in an area adjacent to the dash board 103 and a plurality of side airbag modules 122 provided in an area adjacent to the door 101.

The plurality of front airbag modules 121 may include a first front airbag module 121a provided in an area of the dash board 103 adjacent to the driver's seat 102a. The plurality of front airbag modules 121 may further include a second front airbag module 121b provided in an area of the dash board 103 adjacent to the passenger seat 102b. In this embodiment, the first front airbag module 121a may be provided in a steering wheel.

The first front airbag module 121a and the second front airbag module 121b each may include a fixed type airbag fixedly provided.

The plurality of side airbag modules 122 include a first side airbag module 122a provided in a panel between the door 101a of the driver's seat 102a and the rear seat 102c behind the driver's seat 102a. The plurality of side airbag modules 122 further include a second side airbag module 122b provided in a panel between the door 101b of the passenger seat 102b and the rear seat 102d behind the passenger seat 102b.

The first side airbag module 122a is provided in a side area of the headlining 106 and extends from an upper side of the door 101a of the driver's seat 102a to an upper side of a door of the rear seat 102c behind the driver's seat 102a.

The second side airbag module 122b is provided in a side area of the headlining 106 and extends from an upper side of the door 101b of the passenger seat 102b to an upper side of a door of the rear seat 102d behind the passenger seat 102b.

The first side airbag module 122a and the second side airbag module 122b may be curtain airbags.

The first side airbag module 122a and the second side airbag module 122b each may include a fixed type airbag fixedly provided.

The airbag device 120 further includes a plurality of roof airbag modules 123 and 124 provided in the central area of the headlining 106.

The plurality of roof airbag modules 123 and 124 include a fixed roof airbag module 123 fixedly provided in the central area of the headlining 106 and a movable roof airbag module 124 movably provided in the central area of the headlining 106.

The fixed roof airbag module 123 includes a first fixed roof airbag module 123a provided in a region, of a central area of the headlining 106, corresponding to an area between the driver's seat 102a and the passenger seat 102b in a fixed manner. The fixed roof airbag module 123 further includes a second fixed roof airbag module 123b provided in a region, of the central area of the headlining 106, corresponding to an area between the two rear seats 102c and 102d in a fixed manner.

One or two units of the first fixed roof airbag modules 123a may be provided.

When two units of the first fixed roof airbag modules 123a are provided, one of the first fixed roof airbag modules 123a may be an airbag module deployed toward the driver's seat 102a, and the other may be an airbag module deployed toward the passenger seat 102b.

One or two units of the second fixed roof airbag modules 123b may be provided.

When two units of the second fixed roof airbag modules 123b are provided, one of the second fixed roof airbag modules 123b may be an airbag module deployed toward the left seat 102c of the rear seats, and the other may be an airbag module deployed toward the right seat 102d of the rear seats.

The first fixed roof airbag module 123a is an airbag module that is deployed in the event of a collision when at least one of a state in which the driver's seat 102a is rotated 90 degrees in a first direction and a state in which the passenger's seat 102b is rotated 90 degrees in a second direction.

The second fixed roof airbag module 123b is an airbag module that is deployed in the event of a collision when at least one of a state in which the left seat 102c of the rear seats is rotated 90 degrees in the first direction and a state in which the right seat 102d of the rear seats is rotated 90 degrees in the second direction.

The movable roof airbag module 124 includes first and second movable roof airbag modules 124a and 124b provided in a region, of the central area of the headlining 106, corresponding to an area between the front seats including the driver's seat 102a and the passenger seat 102b and the rear seats 102c and 102d. The movable roof airbag module 124 further includes third and fourth movable roof airbag modules 124c and 124d provided in a region, of the central area of the headlining 106, corresponding to an area between the rear seats 102c and 102d and a trunk 102e.

The first and second movable roof airbag modules 124a and 124b and the third and fourth movable roof airbag modules 124c and 124d may be rotatably provided.

The first and second movable roof airbag modules 124a and 124b and the third and fourth movable roof airbag modules 124c and 124d may movable in a left-and-right direction.

The first and second movable roof airbag modules 124a and 124b and the third and fourth movable roof airbag modules 124c and 124d are airbag modules deployed when a collision occurs and a seat 102 is rotated at an angle between 30 degrees and 150 degrees.

The headlining 106 of the vehicle may be provided with a plurality of rail members 125.

The plurality of rail members 125 includes a first rail member 125a provided in a region, of the central area of the headlining 106, corresponding to an area between the front seats including the driver's seat 102a and the passenger seat 102b and the rear seats 102c and 102d. The plurality of rail members 125 further includes a second rail member 125b provided in a region, of the central area of the headlining 106, corresponding to an area between the rear seats 102c and 102d and the trunk 102e.

The first and second movable roof airbag modules 124a and 124b may be provided in the first rail member 125a so as to be movable in the left-and-right direction. The third and fourth movable roof airbag modules 124c and 124d may be provided in the second rail member 125b so as to be movable in the left-and-right direction.

The left-and-right direction may be directions corresponding to the moving direction between the driver's seat 102a and the passenger seat 102b.

Figure 4:
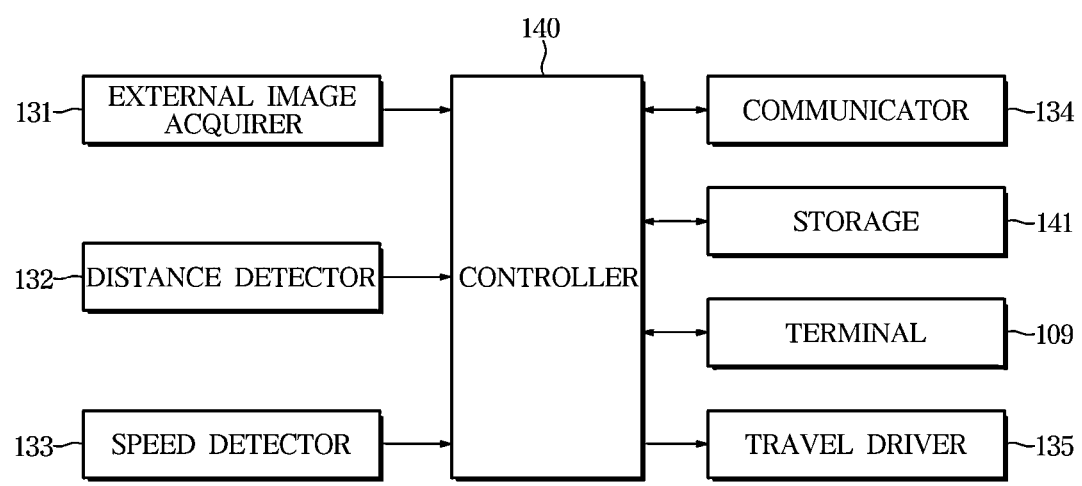
FIG. 4 is a control block diagram illustrating an autonomous driving control device provided in a vehicle according to an embodiment.

FIG. 4 is a control block diagram of a vehicle according to an embodiment. FIG. 4 describes control of autonomous driving.

The vehicle according to the present embodiment is an autonomous driving vehicle. The vehicle recognizes a road environment while traveling, determines a traveling situation, and controls travel based on information related to the recognized road environment, the information related to the traveling situation, and a selected route.

The vehicle according to the present embodiment may include an external image acquirer 131, a distance detector 132, a speed detector 133, a communicator 134, a controller 140, a storage 141, a travel driver 135 for controlling autonomous driving, and a terminal 109.

The external image acquirer 131 is a device for acquiring an image of an object and converting the acquired image into an electrical image signal. The external image acquirer 131 operates to acquire an image of an environment of an outside of a host vehicle at the current position of the host vehicle. In an embodiment, the external image acquirer 131 acquires an image of a road on which the host vehicle is traveling. The external image acquirer 131 further acquires images of objects at front, rear, left, and right sides of the host vehicle. The external image acquirer 131 transmits an image signal of information related to the acquired images to the controller 140.

The image of the road may be an image of a road in a forward direction based on a traveling direction of the host vehicle.

The external image acquirer 131 may include a front camera that acquires an image of the front of the vehicle. The external image acquirer 131 may further include at least one of a left camera and a right camera that acquire images of the left and right sides of the vehicle. The external image acquirer 131 may further include a rear camera that acquires an image of the rear of the vehicle.

The image acquirer 131 is a camera and may include a charge-coupled device (CCD) or complementary metal-oxide semiconductor (CMOS) image sensor.

The image acquirer 131 may be provided on a window glass of a front surface of the vehicle inside the vehicle, may be provided on a rearview or interior mirror inside the vehicle, or may be provided on the roof panel exposed to the outside.

The distance detector 132 detects a signal for detecting an object located outside the host vehicle. In an embodiment, the object may be a preceding vehicle traveling in front of the host vehicle, a stationary object, such as a structure installed around a road, or a vehicle approaching the host vehicle in an opposite lane.

In other words, the distance detector 132 outputs a signal corresponding to the detection of the object in front, left, or right of the host vehicle at the current position of the host vehicle. The distance detector 132 transmits a signal corresponding to a relative distance to the detected object to the controller 140.

The speed detector 133 detects a traveling speed of the host vehicle.

The speed detector 133 includes a plurality of wheel speed sensors provided on the front, rear, left, and right wheels of the host vehicle. The plurality of wheel speed sensors is configured to output detection information (in other words, wheel speed information) corresponding to the rotational speeds of the wheels.

The speed detector 133 may also include an acceleration sensor that outputs detection information (in other words, acceleration information) corresponding to the acceleration of the host vehicle.

The speed detector 133 may include both the plurality of wheel speed sensors and the acceleration sensor.

The communicator 134 transmits and receives information between various electronic devices and sensors provided in the host vehicle. The communicator 134 communicates with an external server, an infrastructure on a road, and other vehicles.

The communicator 134 may perform vehicle to infrastructure (V2I) communication between the host vehicle and an infrastructure. The communicator 134 may perform vehicle to vehicle (V2V) communication with at least one other vehicle among a plurality of other vehicles.

The communicator 134 may include a global positioning system (GPS) receiver.

The GPS receiver receives position information provided from a plurality of satellites to acquire current position information of the host vehicle. In this embodiment, the GPS receiver includes an antenna for receiving signals from a plurality of GPS satellites. The GPS receiver further includes software for acquiring the position of the host vehicle using distance and time information corresponding to position signals of the plurality of GPS satellites. The GPS receiver further includes an output for outputting the acquired current position information of the host vehicle.

The travel driver 135 operates at least one of a power device, a braking device, a steering device, a transmission device, and a suspension device in response to a command of the controller 140. Thus, the vehicle may accelerate, decelerate, brake, and steer while traveling along a selected route.

The vehicle may further include the terminal 109. The terminal 109 may further include the input and the display.

The input of the terminal 109 may receive input of an autonomous driving mode and a manual driving mode, in which the driver directly drives the vehicle. The input may receive destination information or may receive information about a selected route in the autonomous driving mode.

The display of the terminal 109 may display image information generated during program execution, for example, various types of menu image information, digital broadcast image information, or navigation image information under the control of the controller 140. The display of the terminal 109 may display map information matched with selected route information. The display of the terminal 109 may display external image information related to the front of the host vehicle.

The display of the terminal 109 may display information about a mode currently being performed and may display current position information and destination information. The destination information may include address information, total distance information, total required timed information, remaining distance information, remaining time information, and the like.

When the destination information is received through the terminal 109, the controller 140 identifies the current position information. The controller 140 searches for a plurality of routes from the current location to the destination based on the identified current location information and the destination information. The controller 140 identifies a route selected by the user among the found plurality of routes. The controller 140 establishes a plane based on road information of the identified route.

Upon receiving image information of the road during autonomous driving control, the controller 140 performs image processing to recognize lane lines of the road and recognizes a lane on which the host vehicle is traveling based on the recognized position information of the lane lines.

The controller 140 acquires position information of an obstacle based on detection information transmitted from the distance detector 132 during autonomous driving control. In this embodiment, the position information of the obstacle includes distance information about a relative distance to the obstacle.

The controller 140 identifies the distances to the other vehicles traveling in lanes on the left and right sides of the host lane based on the detection information received from the distance detector 132 during the autonomous driving control. The controller 140 identifies the speeds of the other vehicles corresponding to the identified distances of the other vehicles. The controller 140 controls autonomous driving along the selected route while controlling an avoidance traveling based on information about the identified speeds of the other vehicles and the identified distances to the other vehicles.

The controller 140 may change the selected route based on road environment information, traffic information, weather information, and the like received through the communicator 134 during autonomous driving control. The controller 140 may enable the terminal 109 to display the received road environment information, traffic information, weather information, and the like through the display 109.

The controller 140 may allow a map image matched with the selected route, the received road environment information, or obstacle information of the surrounding of the host vehicle to be displayed through the vehicle terminal 109 during autonomous driving control.

The controller 140 may be a controller of an autonomous driving control device for autonomous driving control, may be one of a plurality of electronic control units (ECUs) provided in the vehicle, or may be a controller provided in the airbag device 120.

Figure 5:
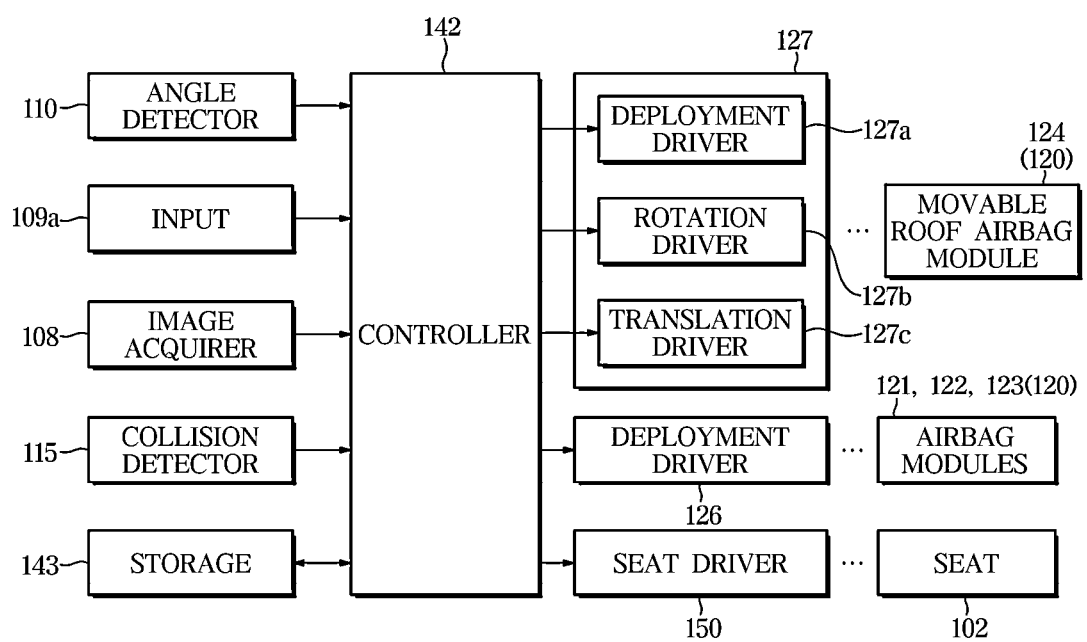
FIG. 5 is a control block diagram illustrating an airbag device provided in a vehicle according to an embodiment.

FIG. 5 is a control block diagram of the vehicle according to the embodiment, in other words, a control block diagram for controlling the airbag device 120.

The vehicle includes the image acquirer 108, an input 109a, the angle detector 110, a collision detector 115, the airbag device 120, a controller 142, a storage 143, and a seat driver 150.

The image acquirer 108 is an interior image acquirer configured to acquire an image of an object inside the host vehicle. The image acquirer 108 may include one camera or a plurality of cameras. The plurality of cameras may acquire images of different areas inside the host vehicle.

The input 109a receives a rotation command of one of the plurality of seats 102.

The input 109a may also receive a rotation angle of one of the plurality of seats 102.

The input 109a may also receive posture information of one of the plurality of seats 102. In this embodiment, the posture information of the seat may be information about a direction in which the occupant is facing when the occupant sits on one of the plurality of seats 102.

The input 109a may be an input provided in the vehicle terminal 109, an input provided in the head unit 105 or a center fascia, or an input provided in each of the plurality of seats 102. The input 109a may be implemented as at least one of a touch pad, a button, a key, a switch, and an operation lever.

The angle detector 110 may be provided in each of the plurality of seats 102.

The angle detector 110 provided in each of the plurality of seats 102 may detect an angle at which each of the plurality of seats 102 rotate. The angle detector 110 may transmit the detected information to the controller 142.

The angle detector 110 may be a current sensor that detects a current flowing in a rotating member (a4, i.e., a motor), a voltage sensor that detects a voltage flowing in the motor, or an encoder, a resolver, or a hall sensor that detects a rotation angle of the motor.

The collision detector 115 detects an occurrence of a collision of the host vehicle and a collision intensity (in other words, the amount of collision).

The collision detector 115 may include a plurality of collision detection sensors installed on the front, rear, and both sides of the host vehicle. The examples of the collision detection sensor may include a micro switch, a limit switch, an acceleration sensor, a pressure sensor, a force sensor, and other various sensors for converting physical information into an electrical signal.

Each of the airbag modules 121, 122, 123, and 124 of the airbag device 120 includes an airbag member that is deployed and expanded toward an interior space in the event of a collision of the host vehicle. Each of the airbag modules 121, 122, 123, and 124 further includes a housing in which the airbag member is received in a folded or rolled state. Each of the airbag modules 121, 122, 123, and 124 further includes an inflator operated by an operation signal of the controller 142 to generate gas and supply the generated gas to the airbag member.

Some airbag modules 121, 122, and 123 of the plurality of airbag modules 121, 122, 123, and 124 include a deployment driver 126 as an airbag driver that deploys an airbag matched with a control command of the controller 142.

For example, each of the airbag modules 121, 122, and 123 may deploy and expand the airbag member in response to the driving of the deployment driver 126 in the event of a collision of the host vehicle. Thus, the front and both sides of an occupant leaning on the back plate member a2 may be protected while the occupant is seated on the seat 102.

The movable roof airbag modules 124 include an airbag driver 127 for driving the movable roof airbag modules 124. The airbag driver 127 includes a deployment driver 127a electrically and mechanically connected to each of the first, second, third, and fourth movable roof airbag modules 124a, 124b, 124c, and 124d. The deployment driver 127a deploys a movable airbag matched with a control command of the controller 142. The airbag driver 127 further includes a rotation driver 127b provided in and electrically and mechanically connected to each of the plurality of movable roof airbag modules 124a, 124b, 124c, and 124d. The rotation driver 127b rotates a movable roof airbag matched with a control command of the controller 142. The movable airbag driver 127 further includes a translation driver 127c provided in and electrically and mechanically connected to each of the plurality of movable roof airbag modules 124a, 124b, 124c, and 124d. The translation driver 127c moves a movable roof airbag matched with a control command of the controller 142 along a rail member in the left-and-right direction.

For example, each roof airbag module 124 may deploy and expand the airbag member in response to the driving of the deployment driver 127a in the event of a collision of the host vehicle. Thus, the front and both sides of an occupant leaning on the back plate member a2 may be protected while the occupant is seated in the seat 102.

The movable roof airbag modules 124 may move along the respective rail members (125: 125a and 125b) and rotate based on the deployment direction in response to the driving of the rotation driver 127b and the translation driver 127c.

Accordingly, the plurality of movable roof airbag modules 124 may protect the occupants by deploying and expanding the airbag members in a lower side direction toward the front and both sides of the occupant in the event of a collision of the host vehicle.

The rotation driver 127b may adjust the deployment angle of the movable airbag modules 124. For example, the rotation driver 127b rotates the housing of the movable airbag modules 124 using a driving force generated by the motor. In another embodiment, the rotation driver 127b rotates the housing to the outer side or the inner side with respect to the rail member 125 using the pressure of a fluid. Thus, the deployment angle of the movable airbag modules 124 may be adjusted.

The translation driver 127c may include a motor that generates a driving force according to a control signal of the controller 142 and a movement module that receives the driving force generated by the motor to move the airbag module along the rail member 125.

When the input 109a is provided for each seat 102, the controller 142, upon receiving a rotation command through the input 109a, may control rotation of the seat 102 having the input 109a. The input 109a has transmitted the rotation command to rotate by a predetermined angle at a predetermined time interval from a start time at which the rotation command is received to an end time.

When the input 109a is provided for each seat 102, the controller 142, upon receiving angle information of the seat 102 from the input 109a, may rotate the seat 102 based on the received angle information.

When the input 109a is provided for each seat 102, the controller 142, upon receiving a rotation command from the input 109a, may check identification information of the seat 102 matched with the input 109a, which has transmitted the rotation command.

When the input 109a for rotating the plurality of seats 102 is provided as a single unit, the controller 142 may control rotation of one of the plurality of seats 102 in response to identification information and angle information of the seat 102 input to the input 109a.

When the input 109a for rotating the respective seats is provided as a single unit, the controller 142 may control rotation of the seat 102 in response to posture information of the seat 102 and identification information of the seat 102 input to the input 109a.

The controller 142 receives an image signal detected by the image acquirer 108 and performs signal processing on the received image signal. In this embodiment, the controller 142 may change the size and format to improve the speed of the signal processing and perform an image quality improvement process.

The controller 142 performs a clearing process and a noise removing process on the image signal to generate image information. The controller 142 applies vision techniques to the image information such that an object is decomposed from the image information. Thus, objects are extracted from the image information as a resultant.

The controller 142 may determine whether an occupant is seated on any seat 102 based on the image information acquired by the one or plurality of image acquirers (108: 108a and 108b).

When an occupant detector is provided in each seat 102, the controller 142 may determine whether an occupant is seated on any seat 102 based on detection information detected by the occupant detector of each seat 102.

When the controller 142 identifies a seat 102 not seated by an occupant, the controller 142 checks and stores identification information of the airbag module provided at a position corresponding to the identified seat 102. The controller 142 controls non-deployment of the airbag module having the stored identification information in the event of a vehicle collision.

The controller 142 may acquire a rotation angle of each seat 102 based on the image information acquired by the one or two or more, i.e., the plurality of image acquirers (108: 108a and 108b).

The controller 142 diagnoses a failure of the plurality of angle detectors 110. If the controller 142 determines that at least one of the plurality of angle detectors 110 fails, the controller 142 checks the identification information of the seat 102 provided with the failed angle detector 110. The controller 142 checks the rotation angle of the seat 102 having the checked identification information based on the image information.

If the controller 142 determines that at least one of the plurality of angle detectors 110 fails, the controller 142 checks the identification information of the seat 102 provided with the failed angle detector 110. The controller 142 checks the position in which the seat 102 is disposed based on the identification information of the seat 102. The controller 142 checks the image acquirer 108 that has acquired an image of an area corresponding to the checked position. The controller 142 acquires the rotation angle of the seat 102 having the checked identification information based on the image information acquired through the checked image acquirer 108.

The controller 142 determines whether an infant or a child rides in the vehicle based on the image information. If the controller 142 determines that an infant or a child rides in the vehicle, the controller 142 checks an airbag module adjacent to the position of the infant or the child among the plurality of airbag modules 121, 122, 123, and 124. The controller 142 stores identification information of the checked airbag module. The controller 142 controls non-deployment of the checked airbag module having the stored identification information in the event of a vehicle collision.

The controller 142 determines whether an infant car seat (i.e., a seat for children) is mounted based on the image information. If the controller 142 determines that an infant car seat is mounted, the controller 142 checks an airbag module provided adjacent to the position where the infant car seat is mounted among the plurality of airbag modules 121, 122, 123, and 124. The controller 142 stores identification information of the checked airbag module. The controller controls non-deployment of the checked airbag module having the stored identification information in the event of a vehicle collision.

The controller 142 may receive mounting information of the infant car seat and identification information of a seat 102 corresponding to a mounting position of the car seat through the input 109a. The controller 142 may store the received identification information. The controller 142 may control non-deployment of an airbag module corresponding to the stored identification information in the event of a vehicle collision.

The controller 142 determines whether a collision has occurred based on detection information output from the collision detector 115. If the controller 142 determines that a collision has occurred, the controller 142 checks the collision position and the collision amount. If the collision amount is greater than or equal to a reference amount, the controller 142 controls the deployment driver of an airbag module provided in the collision position.

The controller 142 determines whether an infant car seat is mounted on the rear seats 102c and 102d based on the image information acquired by the image acquirer 108. If the controller 142 determines that an infant car seat is mounted on the rear seats 102c and 102d, the controller 142 controls deactivation of the roof airbag modules 123b, 124c, and 124d provided in the headlining 106 at a side of the rear seats 102c and 102d. The controller 142 also limits the rotation and movement of the movable roof airbag modules 124c and 124d. This prevents an infant or a child in the infant car seat from being injured in the event of a vehicle collision.

The controller 142 controls activation of the deployment drivers of the first and second front airbag modules 121a and 121b, the first and second side airbag modules 122a and 122b, the first and second fixed roof airbag modules 123a and 123b, and the first to fourth movable roof airbag modules 124a to 124d. If the controller 142 determines that a collision has occurred in at least one of the front, the rear, and the sides of the vehicle, the controller 142 controls deployment of at least one of the first and second front airbag modules 121a and 121b, the first and second side airbag modules 122a and 122b, the first and second fixed roof airbag modules 123a and 123b, and the first to fourth movable roof airbag modules 124a to 124d.

The controller 142 may control activation of at least one of the deployment drivers of the first front airbag module 121a, the first side airbag module 122a, the first fixed roof airbag module 123a, and the first movable roof airbag module 124a when only the driver rides in the vehicle without any passengers. If the controller 142 determines that a collision has occurred, the controller 142 controls the at least one activated deployment driver to control deployment of the at least one airbag module.

If the controller 142 determines that at least one occupant is seated on at least one of the rear seats, the controller 142 may control activation of at least one of deployment drivers of the first and second side airbag modules 122a and 122b, the second fixed roof airbag module 123b, and the third and fourth movable roof airbag modules 124c and 124d. If the controller 142 determines that a collision has occurred, the controller 142 controls the at least one activated deployment driver to deploy the at least one airbag module.

The controller 142 may maintain initial states of movement and rotation of the first, second, third, and fourth movable roof airbag modules 124a, 124b, 124c, and 124d. In another embodiment the controller 142 may control the movement and rotation of the first, second, third and fourth movable roof airbag modules 124a, 124b, 124c, and 124d based on the rotation angle of the seat 102.

Specifically, the controller 142 controls activation of the deployment drivers of the front airbag modules 121a and 121b and the side airbag modules 122a and 122b when the rotation angle of the seat 102 is less than or equal to a first reference angle. The controller 142 controls activation of the deployment drivers of the first front airbag module 121a and the first side airbag module 122a when only the driver's seat 102a is occupied by an occupant and the rotation angle of the driver's seat 102a is less than or equal to the first reference angle.

The controller 142 controls activation of the deployment drivers of the second front airbag module 121b and the second side airbag module 122b when only the passenger seat 102b is occupied by an occupant and the rotation angle of the passenger seat 102b is less than or equal to the first reference angle. In this embodiment, the rotation direction of the passenger seat 102b when the rotation angle of the passenger seat 102b is detected may be opposite to the rotation direction of the driver's seat 102a when the rotation angle of the driver's seat 102a is detected.

The controller 142 controls activation of the deployment drivers of the front airbag module 121 and the fixed roof airbag module 123 if the rotation angle of the seat 102 is greater than the first reference angle and is less than or equal to a second reference angle. The controller 142 controls activation of the deployment drivers of the front airbag module 121, the fixed roof airbag module 123, and the movable roof airbag module 124 if the rotation angle of the seat 102 is greater than the second reference angle and less than or equal to a third reference angle.

The controller 142 controls activation of the deployment drivers of the front airbag module 121, the fixed roof airbag module 123, and the movable roof airbag module 124 if the rotation angle of the seat 102 is greater than the third reference angle and is less than or equal to a fourth reference angle. The controller 142 controls the rotation and movement of the movable roof airbag module 124 based on the rotation angle of the seat 102.

The controller 142 controls activation of the deployment drivers of the front airbag module 121, the side airbag module 122, and the movable roof airbag module 124 if the rotation angle of the seat 102 is greater than the fourth reference angle.

In one embodiment, with the seats 102a and 102c provided on the left side of the vehicle, the detected rotation angle of the seat 102 refers to an angle at which the seat 102 rotates clockwise with respect to a forward direction, i.e. a driving direction of the vehicle.

In another embodiment, with the seats 102b and 102d provided on the right side of the vehicle, the detected rotation angle of the seat 102 refers to an angle at which the seat 102 rotates counterclockwise with respect to the forward direction, i.e. the driving direction of the vehicle.

In other words, the controller 142, based on detection information output from the angle detectors 110 provided in the driver's seat 102a and the passenger seat 102b respectively, checks the rotation angles of the driver's seat 102a and the passenger seat 102b. The controller 42, based on the rotation angles of the driver's seat 10a and the passenger seat 102b, controls activation of the deployment driver of the fixed roof airbag module 123a, controls activation of the deployment drivers of the movable roof airbag modules 124a and 124b, and controls movement and rotation of the movable roof airbag modules 124a and 124b.

For example, upon determining at least one of a state in which the driver's seat 102a is rotated by 90 degrees in the first direction and a state in which the passenger seat 102b is rotated by 90 degrees in the second direction, the controller 142 controls activation of the deployment driver 126 connected to the first fixed roof airbag module 123a. Thus, the first fixed roof airbag module 123a is deployed in the event of a vehicle collision.

A state in which the driver's seat 102a is rotated 90 degrees in the first direction refers to a state in which the driver faces the passenger seat 102b. A state in which the passenger seat 102b is rotated 90 degrees in the second direction refers to a state in which the passenger faces the driver's seat 102a.

Upon determining at least one of a state in which a left side seat 102c of the rear seats behind the driver's seat 102a is rotated by 90 degrees in the first direction and a state in which a right side seat 102d of the rear seats is rotated by 90 degrees in the second direction, the controller 142 controls activation of the deployment driver 126 connected to the second fixed roof airbag module 123b. Thus, the second fixed roof airbag module 123b is deployed in the event of a vehicle collision.

A state in which the left side seat 102c of or among the rear seats behind the driver's seat 102a is rotated by 90 degrees in the first direction refers to a state in which an occupant in the left side seat 102c of the rear seats faces the right side seat 102d of the rear seats. A state in which the right side seat 102d of the rear seats is rotated by 90 degrees in the second direction refers to a state in which an occupant in the right side seat 102d of the rear seats faces the left side seat 102c of the rear seats.

When the controller 142 controls the movement and rotation of the first and second movable roof airbag modules 124a and 124b, the controller 142 controls the movement and rotation of the first and second movable roof airbag modules 124a and 124b such that a direction which the seat plate member a1 of the seat 102 faces is opposite to a direction in which the first and second movable roof airbag modules 124a and 124b are deployed.

If the controller 142 determines that an infant car seat is not mounted on the rear seats 102c and 102d, the controller 142 checks the rotation angles of the rear seats 102c and 102d based on detection information output from the angle detectors 110 provided in the rear seats 102c and 102d. Based on the checked rotation angles of the rear seats 102c and 102d, the controller 142 controls activation of the second fixed roof airbag module 123b and controls activation, movement, and rotation of the third and fourth movable roof airbag modules 124c and 124d.

The controller 142 outputs a control signal for controlling at least one of the deployment driver, the translation driver, and the rotation driver, which are airbag drivers of each airbag module, based on the rotation angle of each seat 102, the occupancy of each seat 102, and the mounting of an infant car seat.

The seat driver 150 may be provided in each of the plurality of seats 102.

In addition, the seat driver 150 may be connected to the plurality of seats 102 and selectively transmit a rotation driving signal to at least one seat 102 based on a control command of the controller 142.

The seat driver 150 rotates the at least one seat 102 in response to the control command of the controller 142.

The seat driver 150, in response to receiving rotation angle information through the controller 142, may rotate the seat 102 based on the received rotation angle information.

The seat driver 160 may also rotate the seat 102 from a start time at which a rotation command is input through the input 109a to an end time at which the input of the rotation command ends.

As described above, the present disclosure may determine the direction and posture of each occupant according to the rotation of each seat 102 provided in the autonomous driving vehicle. The present disclosure may control adjustment of the positions of the airbag modules and the deployment angles of the airbags according to the determination result. Accordingly, the present disclosure may protect an occupant's safety by preventing an impact due to a collision from being transmitted to the occupant in the event of a vehicle collision.

Figure 6:
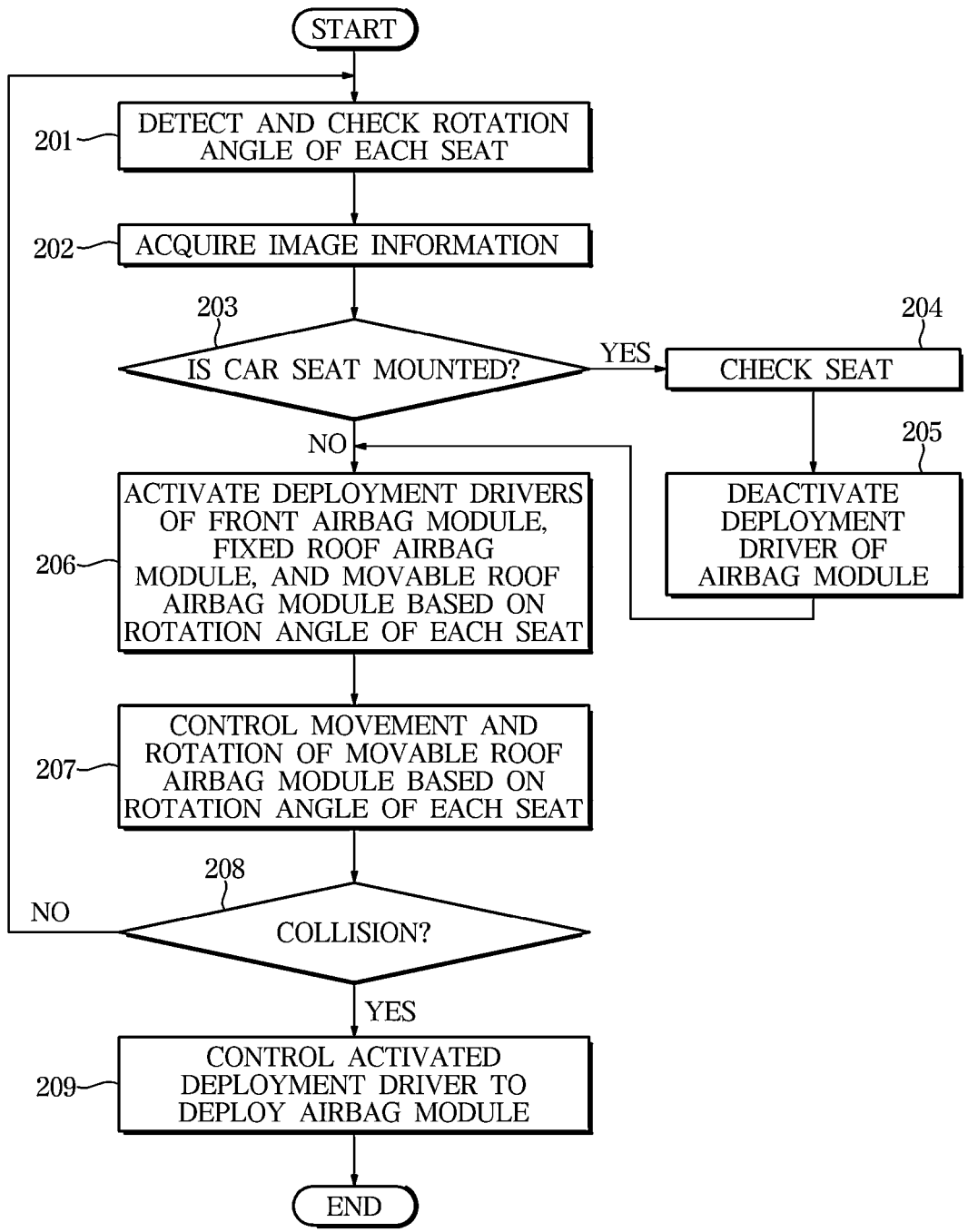
FIG. 6 is a control flowchart of a vehicle according to an embodiment.
Figure 7:
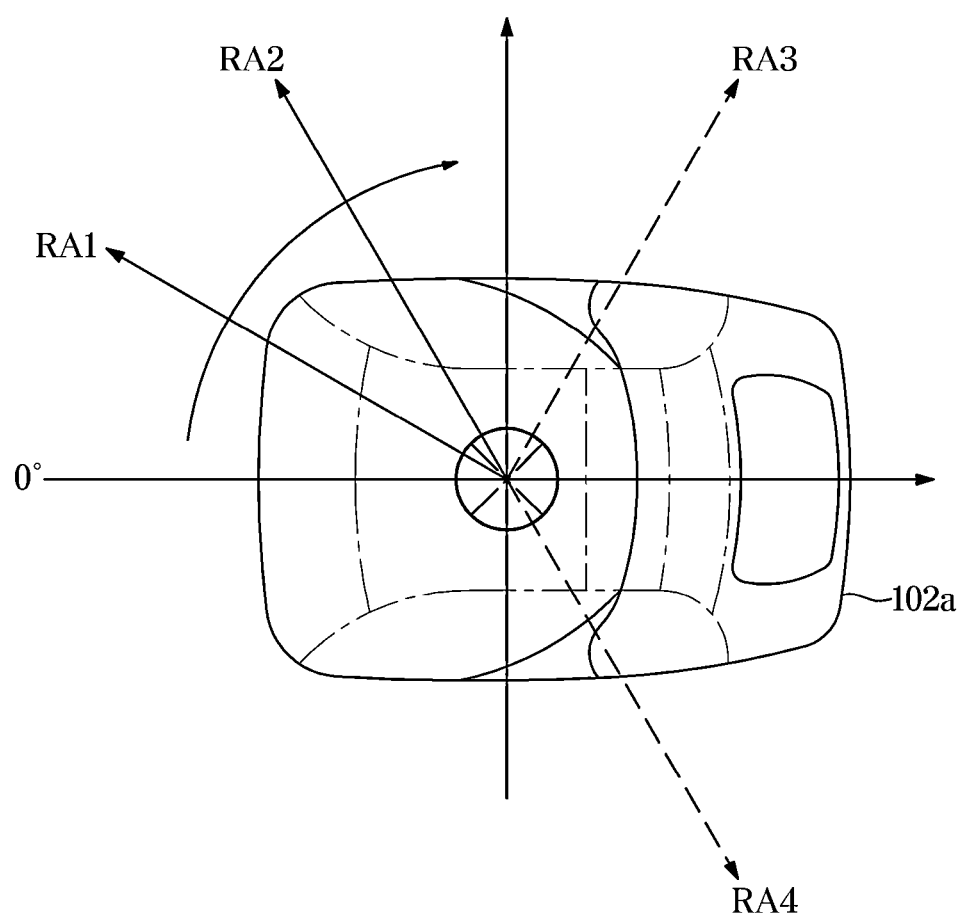
FIG. 7 is a view illustrating a rotation angle of a seat provided in a vehicle according to an embodiment.
Figure 8:
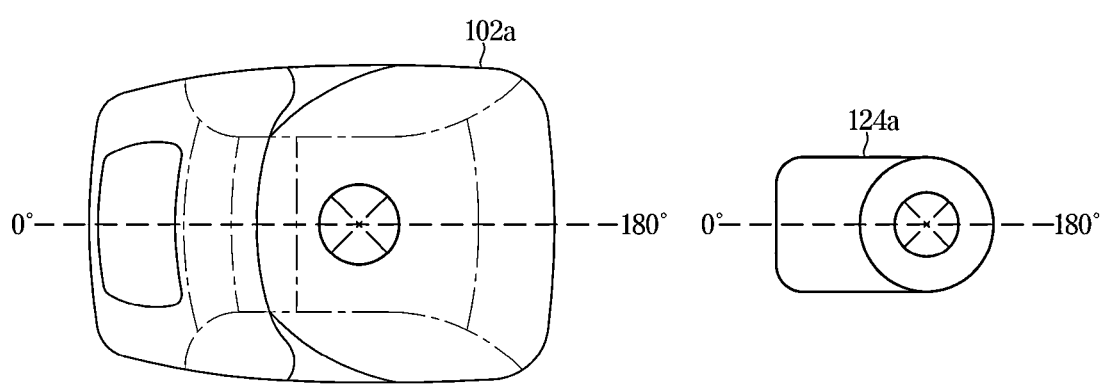
FIGS. 8-10 are views illustrating a movement and rotation of a movable roof airbag in response to a rotation of a seat provided in a vehicle according to an embodiment.

FIG. 6 is a control flowchart of a vehicle according to an embodiment, which is described in conjunction with FIGS. 7 and 8.

Figure 9:
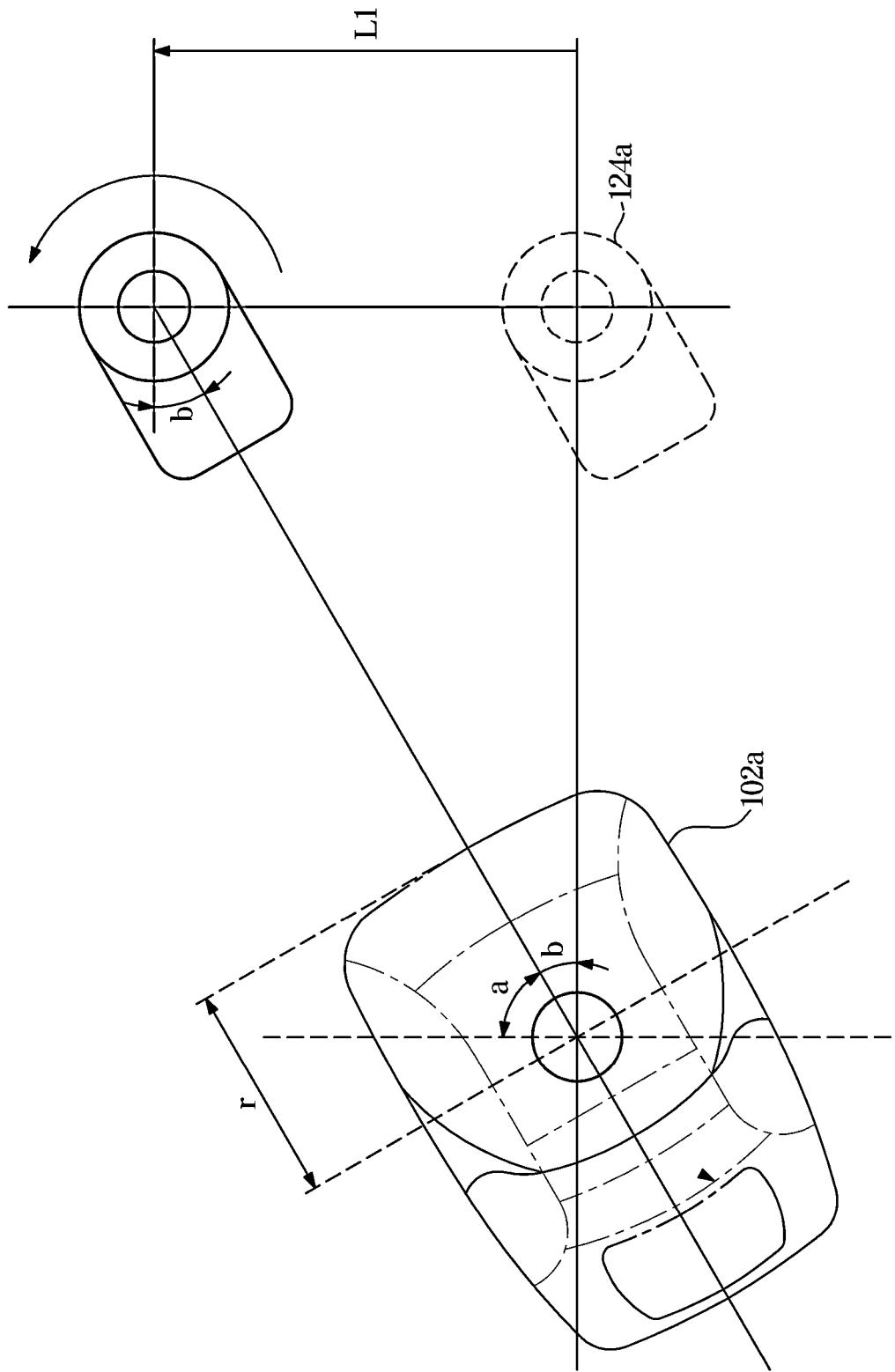
Figure 10:
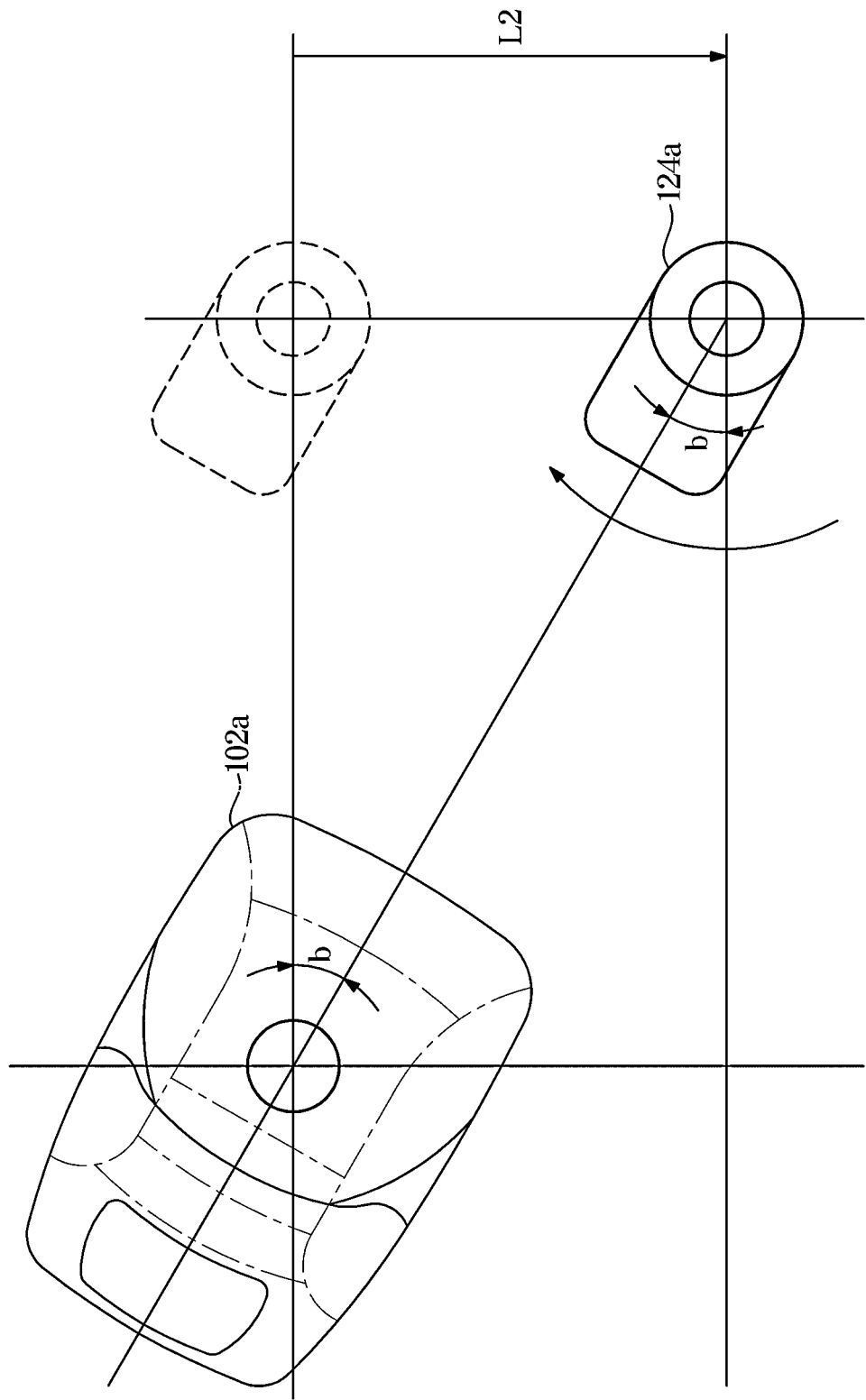

FIG. 7 is a view illustrating a rotation angle of a seat provided in a vehicle according to an embodiment. FIGS. 8-10 are views illustrating a movement and a rotation of a movable roof airbag in response to a rotation of a seat provided in a vehicle according to an embodiment.

When an autonomous driving mode is selected, the vehicle supplies power to the airbag device 120 through a battery (not shown) provided in the vehicle. The vehicle initializes various components provided in the airbag device 120 and prepares to deploy various airbag modules of the airbag device 120 according to the posture and direction of the occupant in the event of a vehicle collision.

The vehicle rotates at least one seat 102 based on a rotation command input through at least one of the inputs 109a provided in the plurality of seats 102.

The vehicle detects rotation angles of the plurality of seats 102 using the angle detectors 110 provided in the plurality of seats 102. The vehicle acquires rotation angle information of each seat 102 based on detection information detected through each angle detector 110.

The vehicle checks the rotation angle of each seat 102 based on the rotation angle information of each seat 102 to drive the plurality of airbag modules of the airbag device (201). In this embodiment, the checking of the rotation angle of each seat 102 includes checking the posture and direction of the occupant seated in each seat 102. The rotation angle of the seat 102 is detected with respect to an angle (0 degrees) when the seat 102 faces forward in the traveling direction of the vehicle.

Before detecting the rotation angle of each seat 102 using the plurality of angle detectors 110, the vehicle diagnoses a failure of the plurality of angle detectors 110. If the vehicle detects that at least one of the plurality of angle detectors 110 fails, the vehicle checks identification information of the seat 102 provided with the failed angle detector 110. The vehicle acquires the rotation angle of the seat 102 having the checked identification information based on the image information acquired by the image acquirer 108.

In addition, when the seat 102 is not provided with an angle detector 110, the vehicle may acquire the rotation angle of the seat 102 having the checked identification information based on the image information acquired by the image acquirer 108.

In addition, the vehicle, upon receiving information about a rotation angle and identification information of a seat 102 through the input 109a, may rotate the seat having the received identification information based on the received rotation angle information. In this embodiment, the vehicle may identify the rotation angle of each seat 102 by checking the rotation angle information input for each seat 102.

The vehicle acquires image information of the image acquirer 108 (202). The vehicle determines whether or not a child car seat (i.e., a car seat for children) is mounted based on the acquired image information (203). If the vehicle determines that a child car seat is mounted, the vehicle checks a seat 102 provided at the position where the child car seat is mounted (204). The vehicle checks the fixed roof airbag module 123 and the movable roof airbag module 124 provided at the position corresponding to the checked seat 102 and controls deactivation of the deployment drivers of the checked fixed roof airbag module 123 and the checked movable roof airbag module 124 (205). In addition, the vehicle maintains the position of the movable roof airbag module 124 provided at the position corresponding to the checked seat 102. In other words, the vehicle does not move or rotate the movable roof airbag module 124 provided at a position corresponding to the checked seat 102.

The vehicle checks at least one seat 102 having no child car seat mounted.

The vehicle, based on the rotation angle of the checked seat, controls activation of some of the deployment drivers of at least one airbag module provided at the position corresponding to the at least one seat 102.

For example, if the vehicle determines that a child car seat is mounted on the left side seat 102c of the rear seats, the vehicle may control activation of the deployment driver of at least one of the first and second front airbag modules 121a and 121b, the second side airbag module 122b, the first fixed roof airbag module 123a, and the first, second, and fourth movable roof airbag modules 124a, 124b, and 124d.

If the vehicle determines that a child car seat is not mounted on any seat 102, the vehicle may control activation of some or all of the deployment drivers of the plurality of airbag modules based on the rotation angles of the plurality of seats 102 (206). In this embodiment, the plurality of airbag modules may include the first and second front airbag modules 121a and 121b, the first and second side airbag modules 122a and 122b, a first type of roof airbag module, and a second type of roof airbag module.

The first type of roof airbag module is a fixed roof airbag module 123. The fixed roof airbag module 123 may be the first or second fixed roof airbag module 123a or 123b. The second type of roof airbag module is a movable roof airbag module 124. The movable roof airbag module 124 may be the first, second, third, or fourth movable roof airbag module 124a, 124b, 124c, or 124d.

The vehicle may control the movement and rotation of the movable roof airbag module 124 provided at a position corresponding to at least one seat 102 based on the rotation angle of the at least one seat 102 (207). In this embodiment, the rotation angle of the at least one seat 102 may be an angle when a front seat 102a or 102b is turned toward a rear seat 102c or 102d. In addition, the rotation angle of the at least one seat 102 may be an angle when a rear seat 102c or 102d is turned toward the trunk.

Next, the vehicle determines whether or not a collision has occurred based on detection information detected by the collision detector 115 (208. If the vehicle determines that a collision has occurred, the vehicle checks a collision position and a collision amount. If the collision amount is greater than a reference amount, the vehicle controls an activated deployment driver to deploy at least one airbag module (209).

In this embodiment, the configuration of deploying an airbag is described. The vehicle generates an ignition signal to ignite an inflator provided in the airbag module having an activated deployment driver. At this time, the inflator is ignited by the ignition signal to generate gas and supplies the generated gas to the airbag member. Thus, the airbag module is deployed and expanded by receiving the generated gas from the inflator to thereby protect the occupant.

Hereinafter, the configuration of the activation control of the deployment driver 126 of the plurality of airbag modules and the movement and rotation control of the plurality of movable roof airbag modules 124a, 124b, 124c, and 124d are described in more detail.

In addition, a configuration of controlling the operation of the airbag device based on the rotation angle of the driver's seat 102a among the plurality of seats 102 are described.

The seat may be rotated 360 degrees both clockwise and counterclockwise. In the case of the driver's seat 102a, the driver's seat 102a may rotate toward the passenger seat side or the rear seat side, but hardly rotates toward the door 101a adjacent to the driver's seat 102a.

The driver's seat 102a may mostly rotate between a zero (0) degree position, at which the driver's seat 102a faces forward in the traveling direction of the vehicle, and an approximate 240 degree position.

Referring to FIG. 7, reference angles are used as information for switching the activation and deactivation of the deployment drivers 126 of the plurality of airbag modules 121, 122, 123, and 124 provided adjacent to the driver's seat 102a. The reference angles are also used as information for changing the moving distance and the rotation angle of the movable roof airbag module 124 among the airbag modules 121,122,123, and 124. The reference angles may include a first reference angle RA1, a second reference angle RA2, a third reference angle RA3, and a fourth reference angle RA4.

In the case of the driver's seat 102a, each reference angle may be an angle when the driver's seat 102a is rotated clockwise with reference to the zero (0) degree position at which the driver's seat 102a faces forward in the traveling direction of the vehicle.

The second reference angle RA2 is an angle greater than the first reference angle RA1. The third reference angle RA3 is an angle greater than the second reference angle RA2. The fourth reference angle RA4 is an angle greater than the third reference angle RA3. For example, the first reference angle RA1 may be about 30 degrees, the second reference angle RA2 may be about 60 degrees, the third reference angle RA3 may be about 120 degrees, and the fourth reference angle RA4 may be about 240 degrees.

In addition, in the case of the passenger seat 102b, each reference angle may be an angle when the passenger seat 102b is rotated counterclockwise with respect to the zero (0) degree position at which the passenger seat 102b faces forward in the traveling direction of the vehicle.

The vehicle controls activation of the deployment drivers 126 of the first front airbag module 121a and the first side airbag module 122a when the rotation angle of the driver's seat 102a is less than or equal to the first reference angle RA1.

In addition, the vehicle controls activation of the deployment drivers 126 of the second front airbag module 121b and the second side airbag module 122b when only the passenger seat 102b is occupied by an occupant and the rotation angle of the passenger seat 102b is less than or equal to the first reference angle. In this embodiment, the rotation direction of the passenger seat 102b when the rotation angle of the passenger seat 102b is detected may be opposite to the rotation direction of the driver's seat 102a when the rotation angle of the driver's seat 102a is detected.

The vehicle controls activation of the deployment drivers 126 of the first front airbag module 121a and the first fixed roof airbag module 123a if the rotation angle of the driver's seat 102a is greater than the first reference angle RA1 and is less than or equal to the second reference angle RA2. The vehicle controls activation of the deployment drivers 126 and 127 of the first front airbag module 121a, the fixed roof airbag module 123a, and the first movable roof airbag module 124a if the rotation angle of the driver's seat 102a is greater than the second reference angle RA2 and less than or equal to the third reference angle RA3.

The vehicle controls activation of the deployment drivers 126 and 127 of the front airbag module 121, the first fixed roof airbag module 123a, and the first movable roof airbag module 124a if the rotation angle of the driver's seat 102a is greater than the third reference angle RA3 and is less than or equal to the fourth reference angle RA4. The vehicle controls rotation and movement of the movable roof airbag module 124 based on the rotation angle of the driver's seat 102a.

The vehicle controls activation of the deployment drivers 126 and 127 of the first front airbag module 121a, the first side airbag module 122a, and the first movable roof airbag module 124a if the rotation angle of the driver's seat 102a is greater than the fourth reference angle RA4.

Hereinafter, the configuration of controlling the rotation and the movement of the movable roof airbag module 124 based on the rotation angle of the driver's seat 102a when the rotation angle of the driver's seat 102a is greater than the third reference angle RA3 and is less than or equal to the fourth reference angle RA4 is described in more detail.

When controlling the movement and the rotation of the first and second movable roof airbag modules 124a and 124b, the vehicle controls a left-and-right movement distance and a rotation angle of the first movable roof airbag module 124a based on the rotation angle of the driver's seat 102a. Thus, a direction which the seat plate member a1 of the driver's seat 102a faces is opposite to a direction in which the first and second movable roof airbag modules 124a and 124b are deployed.

Referring to FIG. 8, when the driver's seat 102a is rotated 180 degrees to face the left side seat 102c of the rear seats, the deployment direction of the first movable roof airbag module 124a faces the seat plate member a1 of the driver's seat 102a. In this embodiment, the direction in which the first movable roof airbag module 124a faces forward in the traveling direction of the vehicle may be set as zero (0) degree, i.e., a reference point for the left-and-right movement.

When the driver's seat 102a is rotated 180 degrees, the first movable roof airbag module 124a facing the seat plate member a1 of the driver's seat 102a has the rotation angle of zero and the left-and-right movement distance of zero.

The first movable roof airbag module 124a rotates with respect to a state facing the seat plate member a1 of the driver's seat 102a by a rotation angle at which the driver's seat 102a is rotated and in a direction opposite to the direction in which the driver's seat 102a is rotated.

The vehicle checks the length between the rotational axis of the driver's seat 102 and the end portion of the seat plate member a1 of the driver's seat 102. The vehicle acquires a left-and-right movement distance based on the checked length and the rotation angle of the first movable roof airbag module 124a. The vehicle moves the first movable roof airbag module 124a based on the acquired left-and-right movement distance.

The length between the rotation axis of the driver's seat 102a and the end portion of the seat plate member a1 of the driver's seat 102a corresponds to a turning radius r of the driver's seat 102a. The turning radius r is preset information.

Referring to FIG. 9, the vehicle acquires a deviation angle (b=90−a) from the 180 degree position based on the rotation angle (90+a) of the driver's seat 102a. The vehicle rotates the first movable roof airbag module 124a counterclockwise by the acquired deviation angle (b=90−a).

The vehicle acquires a left-and-right movement distance based on the preset turning radius r and the deviation angle of the driver's seat 102a. The vehicle moves the first movable roof airbag module 124a based on the acquired left-and-right movement distance. In this embodiment, when the rotation angle of the driver's seat 102a is smaller than 180 degrees, the vehicle moves the first movable roof airbag module 124a by a movement distance L1 in the right direction.

$$L1 = r*(90-a)$$

Referring to FIG. 10, the vehicle acquires a deviation angle (b=90−a) from the 180 degree position based on the rotation angle (90+a) of the driver's seat 102a. The vehicle rotates the first movable roof airbag module 124a in the clockwise direction by the acquired deviation angle (b=90−a).

The vehicle acquires a left-and-right movement distance based on the preset turning radius r and the deviation angle of the driver's seat 102a. The vehicle moves the first movable roof airbag module 124a based on the acquired left-and-right movement distance. In this embodiment, when the rotation angle of the driver's seat 102a is greater than 180 degrees, the vehicle moves the first movable roof airbag module 124a by a movement distance L2 in the left direction.

In other words, the vehicle checks the rotation angles of the respective seats based on the detection information output from the angle detectors 110 respectively provided in the seats 102. The vehicle controls activation of the deployment driver 126 of the fixed roof airbag module 123. The vehicle controls activation of the deployment driver 127 of the movable roof airbag module 124. The vehicle also controls movement and rotation of the movable roof airbag module 124 based on the rotation angles of the seats 102.

As described above, the vehicle determines the direction and posture of each occupant according to the rotation angle of each seat 102 provided in the autonomous driving vehicle. The vehicle controls the position of the airbag module, the distance between the deployed airbag and the occupant, and the deployment angle of the airbag according to the determination result. Accordingly, in the event of a vehicle collision with an obstacle, the vehicle may protect the occupant by preventing the impact of the collision from being transmitted to the occupant.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which the instructions may be decoded by a computer are stored, for example, a Read Only Memory (ROM), a Random Access Memory (RAM), a magnetic tape, a magnetic disk, a flash memory, an optical data storage device, and the like.

As discussed above, the direction in which each occupant faces (in other words, a direction in which the occupant is seated) is determined according to the rotation angle of each seat provided in the autonomous driving vehicle. The position and the rotation of an airbag device are controlled according to a result of the determination. The deployment of the airbag device is controlled in the event of a collision with an obstacle. Thus, an impact caused by the collision is minimized from being transferred to the occupant, thereby safely protecting the occupant.

As described above, the present disclosure can improve the quality and the marketability of the vehicle provided with the airbag device. The present disclosure can further increase the user's satisfaction, improve the convenience of the user, the safety of the vehicle, and secure the competitiveness of the vehicle.

Although embodiments of the present disclosure have been described for illustrative purposes, those having ordinary skill in the art should appreciate that various modifications, additions, and substitutions are possible without departing from the scope and spirit of the present disclosure. Therefore, the embodiments of the present disclosure have not been described for limiting purposes.

What is claimed is:

1. A vehicle comprising:
   a seat;
   a camera configured to acquire an image of the seat;
   a first type of roof airbag module provided in a first area of a headlining with a fixed position in the first area;
   a rail member provided in a second area of the headlining and provided in a direction from left to right of a body of the vehicle;
   a second type of roof airbag module in the rail member provided to be movable in left and right directions along the rail member;
   an angle detector configured to detect a rotation angle of the seat; and
   a controller configured to
      control activation of at least one of the first type of roof airbag module or the second type of roof airbag module based on the rotation angle of the seat detected by the angle detector,
      diagnose whether the angle detector fails, and
      in response to a determination that the angle detector fails:
         identify the rotation angle of the seat based on the image of the seat acquired by the camera, and
         control activation of at least one of the first type of roof airbag module or the second type of roof airbag module based on the rotation angle of the seat identified by the image of the seat.

2. The vehicle of claim 1, wherein the controller is configured to
   determine whether an infant or a child sits on the seat based on the image of the seat acquired by the camera, and
   control deactivation of the first type of roof airbag module and the second type of roof airbag module when the controller determines that the infant or the child sits on the seat.

3. The vehicle of claim 1, wherein the controller is configured to
   control the activation of the first type of roof airbag module when the rotation angle of the seat identified by the image of the seat or the rotation angle of the seat detected by the angle detector is greater than a first reference angle and less than or equal to a second reference angle, and
   control the activations of the first type of roof airbag module and the second type of roof airbag module when the rotation angle of the seat identified by the image of the seat or the rotation angle of the seat detected by the angle detector is greater than the second reference angle and less than or equal to a third reference angle.

4. The vehicle of claim 3, further comprising:
   a front airbag module provided in front of the seat and a side airbag module provided between the seat and a door,
   wherein the controller is configured to
      control activation of the front airbag module and the side airbag module when the rotation angle of the seat identified by the image of the seat or the rotation angle of the seat detected by the angle detector is less than the first reference angle,
      control activation of the front airbag module when the rotation angle of the seat identified by the image of the seat or the rotation angle of the seat detected by the angle detector is greater than the first reference angle and less than or equal to the second reference angle, and
      control activation of the front airbag module, the side airbag module, and the second type of roof airbag module when the rotation angle of the seat identified by the image of the seat or the rotation angle of the seat detected by the angle detector is greater than a fourth reference angle.

5. The vehicle of claim 4, wherein the second reference angle is an angle greater than the first reference angle, the third reference angle is an angle greater than the second reference angle, and a fourth reference angle is an angle greater than the third reference angle.

6. The vehicle of claim 1, further comprising:
   a collision detector configured to detect a collision with an obstacle,
   wherein the controller is configured to control deployment and expansion of the activated airbag module among the first type of roof airbag module and the second type of roof airbag module based on collision information detected by the collision detector, and
   wherein a direction in which the second type of roof airbag module is deployed is opposite to a direction in which the seat is rotated 180 degrees with respect to a forward traveling direction of the vehicle.

7. The vehicle of claim 1, further comprising:
   an external camera configured to acquire an image of a road; and
   a road detector configured to detect a distance to an obstacle,
   wherein the controller is configured to control autonomous driving based on the image of the road acquired by the external camera and the distance to the obstacle detected by the road detector.

8. A method of controlling a vehicle, the method comprising:
   detecting, by an angle detector, a rotation angle of a seat;
   acquiring, by a camera, an image of the seat;
   controlling, by the controller, activation of at least one of a first type of roof airbag module or a second type of roof airbag module based on the rotation angle of the seat detected by the angle detector;

determining, by a collision detector, whether a collision with an obstacle has occurred during traveling; and deploying, by the controller, and expanding the activated airbag module when determining that a collision with the obstacle has occurred, wherein the first type of roof airbag module is provided in a first area of a headlining with a fixed position in the first area, and wherein the second type of roof airbag module is in a rail member and provided to be movable in left and right directions along the rail member, wherein controlling the activation of the at least one of the first type of roof airbag module or the second type of roof airbag module comprising:

diagnosing, by the controller, whether the angle detector fails, and in response to a determination that the angle detector fails:

acquiring, by the camera, an image of the seat, identify, by the controller, the rotation angle of the seat based on the image of the seat acquired by the camera, and controlling, by the controller, activation of at least one of the first type of roof airbag module or the second type of roof airbag module based on the rotation angle of the seat identified by the image of the seat.

9. The method of claim 8, further comprising:

determining, by the controller, whether an infant or a child sits on the seat based on the image acquired by the camera; and controlling, by the controller, deactivation of the first type of roof airbag module and the second type of roof airbag module when determining that the infant or the child sits on the seat.

10. The method of claim 8, wherein controlling the activation of the at least one of the first type of roof airbag module or the second type of roof airbag module includes:

controlling activation of the first type of roof airbag module when the rotation angle of the seat identified by the image of the seat or the rotation angle of the seat detected by the angle detector is greater than a first reference angle and less than or equal to a second reference angle; and controlling activations of the first type of roof airbag module and the second type of roof airbag module when the rotation angle of the seat identified by the image of the seat or the rotation angle of the seat detected by the angle detector is greater than the second reference angle and less than or equal to a third reference angle.

11. The method of claim 8, further comprising:

controlling, by the controller, activation of a front airbag module and a side airbag module when the rotation angle of the seat identified by the image of the seat or the rotation angle of the seat detected by the angle detector is less than a first reference angle;

controlling, by the controller, activation of the front airbag module when the rotation angle of the seat identified by the image of the seat or the rotation angle of the seat detected by the angle detector is greater than the first reference angle and less than or equal to a second reference angle; and controlling, by the controller, activation of the front airbag module, the side airbag module, and the second type of roof airbag module when the rotation angle of the seat identified by the image of the seat or the rotation angle of the seat detected by the angle detector is greater than a fourth reference angle, wherein the front airbag module is provided in front of the seat and the side airbag module is provided between the seat and a door.

\* \* \* \* \*